United States Patent [19]

Francis

[11] 4,387,183

[45] Jun. 7, 1983

[54] THROMBORESISTANT MOLDED ARTICLE AND METHOD FOR ITS PRODUCTION

[75] Inventor: Peter S. Francis, Rose Valley, Pa.

[73] Assignee: Atlantic Richfield Company, Los Angeles, Calif.

[21] Appl. No.: 311,841

[22] Filed: Oct. 16, 1981

[51] Int. Cl.$^3$ ............................................. C08F 8/12
[52] U.S. Cl. .................................... 525/54.23; 427/2; 427/336; 427/400; 428/409; 525/57; 525/186
[58] Field of Search ........................ 427/2, 336, 400; 525/57, 186, 54.23; 428/409

[56] References Cited

U.S. PATENT DOCUMENTS

| | | | |
|---|---|---|---|
| 3,453,194 | 7/1969 | Bennett et al. | 427/2 |
| 3,695,921 | 10/1972 | Shepherd et al. | 427/2 |
| 4,055,682 | 10/1977 | Merrill | 427/2 |
| 4,100,309 | 7/1978 | Micklus et al. | 427/400 |
| 4,143,218 | 3/1979 | Adams et al. | 427/336 |
| 4,310,593 | 1/1982 | Gross | 427/2 |

FOREIGN PATENT DOCUMENTS 2748858  3/1979  Fed. Rep. of Germany .......... 427/2

*Primary Examiner*—Michael R. Lusignan
*Assistant Examiner*—Janyce A. Bell

[57] ABSTRACT

A molded article which consists of a core comprising a copolymer of a monovinyl aromatic monomer and an alpha, beta-unsaturated cyclic anhydride and a grafted water-swollen hydrophilic polymer coating on the core is particularly suitable for use as a blood-contacting article.

1 Claim, No Drawings

THROMBORESISTANT MOLDED ARTICLE AND METHOD FOR ITS PRODUCTION

This invention pertains to molded articles, and more specifically, to molded articles which come in contact with blood.

In one of its more specific aspects, this invention relates to grafting hydrophilic polymer side chains on the anhydride groups of a copolymer of a monovinyl aromatic monomer and an alpha, beta unsaturated cyclic anhydride molded article, which grafting renders the surface of the molded article thromboresistant.

When blood contacts a foreign surface, a layer of thrombus—white cells, fibrin and platelets, all blood components—is deposited on the material and blood clotting results. Thrombus formation is a problem if blood is to be collected and stored. Accordingly, thromboresistance is a preferred surface characteristic of all blood-contacting molded articles such as, for example, blood bags and tubing.

It is well known that thrombus formation on blood-contacting surfaces can be totally avoided by treating the blood with systemic anticoagulant drugs such as heparin or coumadin; however, the use of such a drug requires that the blood be treated twice. The blood must be "heparinized" when removed from the body and, before the "heparinized" blood is reinjected into the body, it must again be treated to nullify the anticoagulating effect of the heparin. For this reason, those skilled in the art of medical plastics continue to search for plastic materials which are nonthrombogenic, that is, which do not require the use of systemic anticoagulant drugs.

Along these lines of research much work has been done related to hydrogels on the hypothesis that a water gel surface should be less recognizable as a foreign surface to blood. Although this hypothesis has been proven to be correct, hydrogels have not been found suitable for use to produce molded articles because they are structurally weak and "cheesy" and because it is difficult to physically bond them to other materials which would provide the needed mechanical strength.

The present invention helps to solve the above problems and provides for the grafting of hydrophilic polymer side chains onto the anhydride groups of a copolymer of a monovinyl aromatic monomer and an alpha, beta unsaturated cyclic anhydride molded article, which grafting renders the surface of the molded article thromboresistant.

According to this invention, there is provided a method of treating the surface of a molded article produced from a molding composition comprising a copolymer of a monovinyl aromatic monomer and an alpha, beta-unsaturated cyclic anhydride to render the surface thromboresistant, which method comprises: (a) grafting hydrophilic polymer chains on at least a portion of the anhydride groups on the copolymer at the surface of the molded article, the amount of grafting being sufficient to render the surface of the molded article thromboresistant upon subsequent contact with water, and (b) contacting the hydrophilic polymer with water to swell the polymer and render the surface of the molded article thromboresistant.

According to this invention, there is also provided a nonthrombogenic molded article which consists of a core comprising a copolymer of a monovinyl aromatic monomer and an alpha, beta-unsaturated cyclic anhydride and a grafted water-swollen hydrophilic polymer coating on the core.

The molded copolymer employed in this invention will be a molded copolymer of a monovinyl aromatic monomer and an alpha, beta unsaturated cyclic anhydride.

The copolymer will contain from about 70 to about 98 weight percent of a monovinyl aromatic monomer.

Suitable monovinyl aromatic monomers include styrene, alpha-methyl styrene, nuclear methyl styrenes, ethyl styrene, isopropyl styrene, tert-butyl styrene and the like and mixtures thereof.

The copolymer will contain from about 2 to about 30 weight percent of an alpha, beta-unsaturated cyclic anhydride.

Suitable anhydrides include maleic anhydride, fumaric anhydride, itaconic anhydride, citraconic anhydride, mesaconic anhydride, ethyl maleic anhydride, methyl itaconic anhydride and the like and mixtures thereof.

Optionally, the copolymer can comprise various additives such as, for example, one or more rubbery additives which may be blended with the copolymer as taught in U.S. Pat. Nos. 4,097,550, 4,097,551, 3,641,212 and 2,914,505 or incorporated prior to polymerization as taught in U.S. Pat. No. 3,919,354.

The grafting of the water soluble hydrophilic polymer on the surface of the styrene-maleic anhydride copolymer molded article can be achieved using any suitable method.

A preferred method of grafting is to simply immerse the molded product for about 2 to about 12, preferably 4 to about 8, minutes in a mixture of hydrophilic polymer, solvent and catalyst.

Any suitable water soluble hydrophilic polymer having free hydroxy groups can be employed in the practice of this invention, typically being employed in an amount within the range of from about 1 to about 30 percent by weight of the total weight of the mixture.

Suitable hydrophilic polymers are water soluble naturally occuring polysaccharides, alkyl and alkoxy derivatives of water soluble naturally occuring polysaccharides and water soluble synthetic polymeric alcohols and their mixtures.

Particularly suitable water soluble naturally occuring polysaccharides are corn starch, wheat starch, potato starch, locust bean gum, guar gum, alginates, carageenins and the like and their mixtures.

Particularly suitable alkyl and alkoxy derivatives of naturally occuring polysaccharides are methylcellulose, hydroxyethylcellulose, hydroxypropylcellulose and the like and their mixtures.

Particularly suitable water soluble synthetic polymeric alcohols are polyvinyl alcohol, polyhydroxyethyl acrylate and the like and their mixtures.

As the catalyst use can be made of any tertiary amine such as pyridine, diethylbenzyl amine, triethyl amine, dimethylaniline and the like and their mixtures. The catalyst will be employed in an amount within the range of from about 1 to about 20 percent by weight of the total weight of the mixture. Preferably the catalyst will be employed in an amount of from about 2 to about 10 percent by weight.

Any solvent which will not dissolve or react with styrene-maleic anhydride copolymer over the immersion contact time but which will dissolve the water soluble hydrophilic polymer having free hydroxy groups will make up the balance of the mixture. One particularly suitable solvent is dimethyl sulfoxide (DMSO).

This invention is demonstrated by the following examples.

EXAMPLE I

A first mixture (Mixture I) was prepared by introducing into a mixing vessel at room temperature with agitation, 10 parts by weight methylcellulose, 6 parts by weight pyridine catalyst and 84 parts by weight DMSO.

Three 6"×6"×⅛" clear molded plates A, B and C were prepared by injection molding a 92 weight percent styrene—8 weight percent maleic anhydride copolymer molding composition designated DYLARK® 232 resin, commercially available from ARCO Chemical Company.

Plates A, B and C were separately immersed in Mixture I for 3, 6 and 12 minutes, respectively.

After the above specified immersion periods, each plate was rinsed with tap water followed by soaking in tap water for about 48 hours, during which period the water was changed three times. To the water used for the first soaking was added about 1 percent by weight acetic acid which served to neutralize the tertiary amine catalyst.

After about 48 hours the plates were removed from the water and observed to be white and to exhibit a low level of surface gloss.

Plates A, B and C and a Control plate, which was prepared in the same manner as Plates A, B and C (with the exception that it was immersed in a mixture which contained no methylcellulose), were separately immersed in a solution of methyl purple dye. Plates A, B and C did not change color; they remained white. The Control plate turned uniformly blue indicating extensive dye absorption.

Plates A, B and C on the other hand did not absorb dye indicating that the grafted side chains of methylcellulose were closely crosslinked such that the dye molecules could not penetrate and stain the styrene-maleic anhydride copolymer core.

EXAMPLE II

A second mixture (Mixture II) was prepared by introducing into a mixing vessel at room temperature with agitation, 10 parts by weight hydroxyethylcellulose, 6 parts by weight pyridine catalyst and 84 parts by weight DMSO.

Three 6"×6"×⅛" clear molded plates D, E and F were prepared as described in Example I and separately immersed in Mixture II for 3, 6 and 12 minutes, respectively.

After the above specified immersion periods, each plate was rinsed and soaked in tap water following the method of Example I.

After water soaking, each plate was observed to be white and to exhibit a smooth high level of surface gloss.

Plates D, E and F and a Control were likewise immersed in a solution of methyl purple dye. Plates D, E and F did not absorb dye; they remained white. The Control plate turned uniformly blue.

From the above examples it is apparent that the method of the subject invention serves to facilitate the formation of a tightly bound coating of hydrophilic polymer on the surface of a copolymer molded article. Inasmuch as the molded articles of this invention exhibit mechanical strength and the surface characteristic of thromboresistance they are particularly suitable for use in contact with blood.

It will be apparent from the foregoing that various modifications can be made to this invention. Such, however, are considered to be within the scope of this invention.

What is claimed is:

1. A method of treating the surface of a molded article, produced from a molding composition comprising a copolymer of a monovinyl aromatic monomer and an alpha, beta-unsaturated cyclic anhydride, to render the surface thromboresistant, which method comprises: (a) grafting hydrophilic polymer chains on at least a portion of the anhydride groups on the copolymer at the surface of the molded article, the amount of grafting being sufficient to render the surface of the molded article thromboresistant upon subsequent contact with water, and (b) contacting the hydrophilic polymer with water for a period sufficient to swell the polymer and render the surface of the molded article thromboresistant.

* * * * *